H. E. FENDRING.
ROLLING PIN.
APPLICATION FILED SEPT. 30, 1908.
931,691.  Patented Aug. 17, 1909.
Fig. 1.
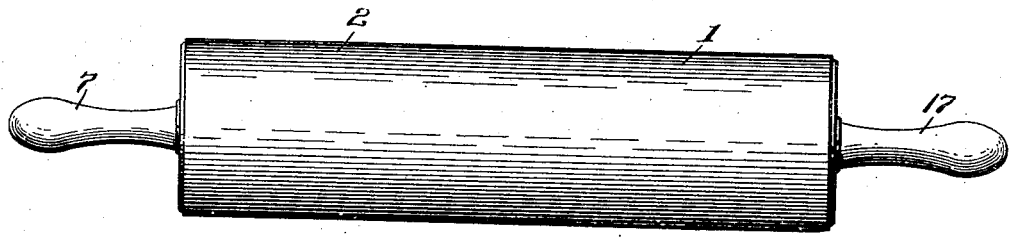
Fig. 2.
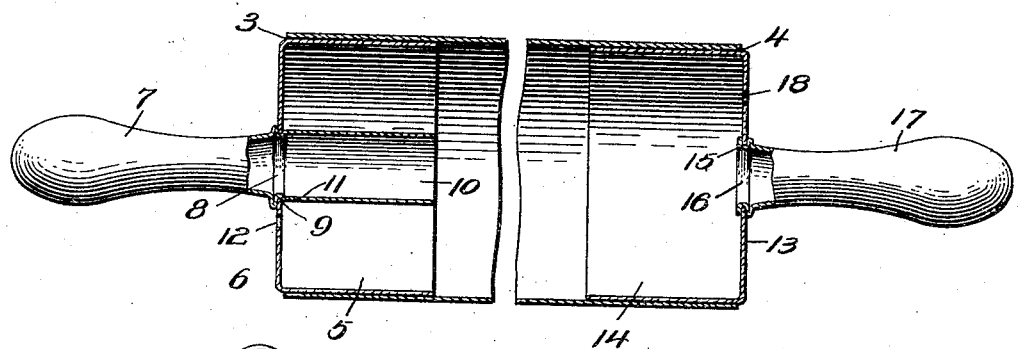
Fig. 3.  Fig. 4.
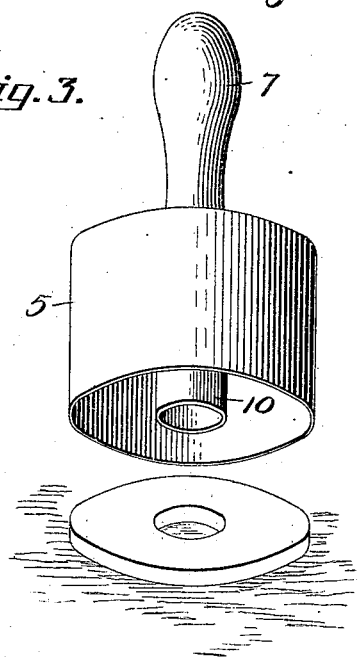 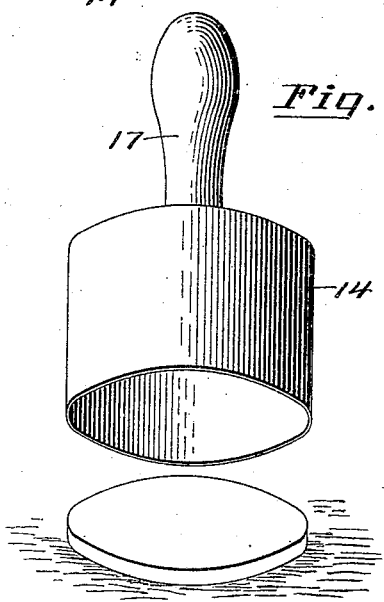
Witnesses  Inventor
F. C. Gilson  Helmer E. Fendring.
  By Victor J. Evans
    Attorney

UNITED STATES PATENT OFFICE.

HELMER E. FENDRING, OF DOYON, NORTH DAKOTA, ASSIGNOR OF ONE-HALF TO RANG SANDIE, OF DOYON, NORTH DAKOTA.

ROLLING-PIN.

No. 931,691.  Specification of Letters Patent.  Patented Aug. 17, 1909.

Application filed September 30, 1908. Serial No. 455,428.

*To all whom it may concern:*

Be it known that I, HELMER E. FENDRING, a citizen of the United States, residing at Doyon, in the county of Ramsey and State of North Dakota, have invented new and useful Improvements in Rolling-Pins, of which the following is a specification.

This invention relates to rolling pins, and has for an object to construct a rolling pin so that the handles thereof may be removed, and to provide the said handles with means for cutting doughnuts or cookies, biscuits or the like.

A further object of this invention is to provide a rolling pin which may be made exclusively of sheet material and placed upon the market at a relatively low figure.

Other objects and advantages will be apparent as the nature of the invention is better set forth, and it will be understood that changes within the scope of the claims may be resorted to without departing from the spirit of the invention.

In the drawing, forming a portion of this specification and in which like numerals of reference indicate similar parts in the several views:—Figure 1 is a plan of the rolling pin, Fig. 2 is a longitudinal section of portions of the pin showing the same on an enlarged scale, Fig. 3 is a perspective view of one of the handles and the doughnut cutter carried thereby, Fig. 4 is a perspective view of the other handle and its biscuit or cookie cutter.

Referring now more particularly to the drawing, there is shown a rolling pin 1, comprising an elongated tubular member 2, preferably constructed from suitable sheet material, and as shown, the said tubular member has open ends 3 and 4. The end 3 receives a cylindrical member 5 having a head 6 at its outer end adapted to close the end 3 of the member 2 and the said head carries a handle 7 constructed from metal having an intermediate beaded portion 8 to engage the walls of an opening 9 formed in the head 6. The said handle has formed integrally therewith an inwardly directed tube 10 having its inner edge disposed in line with the inner open end of the member 5. The tube 10 has formed therein a vent opening 11, and the head 6 has formed therein a similar opening 12.

It will be seen that the construction of handle 7 and the member 5 carried thereby effectively provides means for cutting dough when it is desired to make doughnuts or the like as clearly illustrated in Fig. 3 of the drawing, the tube 10 being provided to form the central perforation of the doughnut, as is obvious.

The end 4 of the member 2 is closed by a cap 13 formed at the outer end of a cylindrical member 14 having its walls fitted within the walls of the said member 2 and as shown, the said head 13 has formed therein a passage 15 to receive the inner crimped end 16 of a handle 17. The head 13 is provided with a vent opening 18, as clearly shown in Fig. 2 of the drawing.

It will be seen that an extremely simple and useful rolling pin is provided which may be manufactured at a relatively low figure and which will serve a plurality of purposes requiring the use heretofore of independent kitchen articles.

By providing the handles 7 and 17 with crimped portions as herein set forth and described, it will be seen that the elongated tubular member 2 is free to rotate when the said handles are held stationary or in the hands of an operator, and the construction obviates the use of pivot pins or the like for attaching the handles to the ends of the member 2.

I claim:—

1. A rolling pin comprising an elongated hollow tubular member, removable heads closing the ends of said tubular member and having annular walls frictionally engaged with the walls of said member, and handles having portions crimped to said heads so that they are revolubly mounted.

2. A rolling pin comprising an elongated hollow member, cylindrical members having open inner ends, said cylindrical members being disposed within the elongated member at the ends thereof and provided with heads adapted to close the ends of the said elongated member, handles carried by the cylindrical members and having portions crimped thereto so that the elongated hollow member may be rotated when the handles are held, and a tube projecting into the pin from one of the said handles and having its inner end disposed in line with the inner end of one of the said cylindrical members.

3. A rolling pin comprising an elongated hollow member, a cylindrical member disposed in the elongated hollow member at one of its ends and provided with a head having a vent passage formed therein and a handle carried by the head and having a portion crimped thereto, a cylindrical member disposed in the other end of the said elongated member and provided with a head having a vent passage formed therein, a handle carried by the head and having a portion crimped thereto, and a tube having its walls disposed in spaced relation to the walls of the cylindrical member and carried by said handle, said crimped portions of the handles being provided to allow rotation of the elongated hollow member when said handles are held.

In testimony whereof I affix my signature in presence of two witnesses.

HELMER E. FENDRING.

Witnesses:
P. L. KLYVER,
J. H. BLAUFUSS.